United States Patent [19]

Rioux

[11] Patent Number: 4,627,734
[45] Date of Patent: Dec. 9, 1986

[54] THREE DIMENSIONAL IMAGING METHOD AND DEVICE

[75] Inventor: Marc Rioux, Ottawa, Canada

[73] Assignee: Canadian Patents and Development Limited, Ottawa, Canada

[21] Appl. No.: 819,477

[22] Filed: Jan. 16, 1986

Related U.S. Application Data

[63] Continuation of Ser. No. 509,373, Jun. 30, 1983, abandoned.

[51] Int. Cl.$^4$ .......................... G01C 3/00; G01B 11/24
[52] U.S. Cl. ........................................ 356/376; 356/1; 356/373
[58] Field of Search .................... 356/373, 375, 376, 1; 350/6.7–6.9

[56] References Cited

U.S. PATENT DOCUMENTS

| | | | |
|---|---|---|---|
| 3,813,140 | 5/1974 | Knockeart | 350/7 |
| 3,826,578 | 7/1974 | King et al. | 350/6.8 |
| 3,986,774 | 10/1976 | Lowrey, Jr. et al. | 356/376 |
| 4,170,398 | 10/1979 | Koester | 350/6.8 |
| 4,171,917 | 10/1979 | Pirlet | 356/376 |
| 4,218,142 | 8/1980 | Kryger et al. | 356/431 |
| 4,246,612 | 1/1981 | Berry et al. | 356/6.8 |
| 4,329,012 | 5/1982 | Minoura et al. | 350/6.8 |
| 4,373,804 | 2/1983 | Pryor et al. | 356/376 |

FOREIGN PATENT DOCUMENTS 0096916  7/1908  Japan ...................................... 350/6.8

OTHER PUBLICATIONS

Kanade et al., "Non-Contact Visual Three Dimensional Ranging Devices", SPIE Proc. vol. 283, 1981, pp. 48–53.
Morander, "The Optocator, A High Precision, Non-Contacting System for Dimension and Surface Measurement and Control" 5th Interntl. Conf. on Automated inspection and Product Control, 1980, pp. 393–396.
Page et al., "Non-Contact Inspection of Complex Components Using a Range Finder Vision System", Proc. of The 1st Int. Conf. on Robot Vision and Sensory Controls, 1981, pp. 245–254.

Primary Examiner—Ra Rosenberger
Assistant Examiner—Crystal D. Cooper

[57]   ABSTRACT

A three dimensional imaging system operating in accordance with the known active triangulation method employs a laser beam that is projected onto an area of a surface the profile of which is to be examined. A beam reflected from such area is received in a position sensitive detector. With synchronised scanning of the projected and detected beams by a system of mirrors, the detected position in the detector remains unchanged when the surface under examination is a flat reference plane, changing only as a measure of the degree of deviation of each examined area from such reference plane in a direction Z. The system is characterised by this basic scanning being carried out in such a way that the beams are scanned in a direction X lying in the beam plane, i.e. the plane defined by the beams, and by a further simultaneous and synchronous scanning that takes place in a direction Y. The directions X, Y and Z are all mutually perpendicular. The system has the advantage over prior systems of enabling surface profiling by means of a device that is compact, has a large field of view and can be arranged to have extremely rapid operation, i.e. a small fraction of a second to record a full image. While this speed of operation enables the system to determine the three dimensional shape of moving articles it has the advantage that it is not dependent on movement of the article to achieve full scanning.

22 Claims, 15 Drawing Figures

THREE DIMENSIONAL IMAGING METHOD AND DEVICE

This application is a continuation of application Ser. No. 509,373, filed June 30, 1983, now abandoned.

BACKGROUND OF THE INVENTION

The present invention relates to a three dimensional imaging method and device, that is to say a method and device for obtaining three dimensional data of a target surface or other object, whether such data is displayed in three dimensional form or not. Indeed, the data may never be displayed as such, but may merely be used to control other equipment. Such a device is useful for supplying three dimensional data to other instruments. The data can be valuable in the science of robotics, where objects are required to be identified on the basis of their three dimensional shape and manipulated accordingly. Such data is also useful in monitoring the accuracy of the shape of a series of articles intended to be identical with each other.

One of the objectives of the present invention is to develop a low cost, compact, high-speed three dimensional imaging device to be used in automatic assembly. The ability to analyze the three dimensional data of a scene very quickly, i.e. in a fraction of a second, has many practical advantages, especially in an industrial environment. It reduces interference problems, as well as the results of mechanical, acoustic and electromagnetic vibrations. Moreover, moving objects can readily be surveyed and measured.

The output from such a three dimensional imaging device is similar to a television signal except that the amplitude of the signal is related to the geometric characteristics of the object. In contrast, ordinary two dimensional television cameras provide an output signal having an amplitude that is not geometrically related to the object but represents the surface reflectance properties of the object, combined with the ambient light conditions, its orientation and the intensity and spectral characteristics of such ambient light. The result is thus usually affected by the orientation of the object and the proximity of other objects. It is primarily for these reasons that the extraction of three dimensional features from a two dimensional image of a scene is difficult to realize.

There are many applications, such as in robotics, where a relatively low resolution, three dimensional image is sufficient to enable the equipment to discriminate between various known objects, as opposed to a detailed inspection task where it is necessary to make fine comparisons between the ideal shape and the actual manufactured part.

An objective of the present invention is to provide a system that is versatile in that it enables selection either of high resolution, i.e. sensitive discrimination, with some sacrifice in speed, or alternatively, extremely fast operation, e.g. down to 0.01 second for a typical image size of $128 \times 128$ pixels, for those situations where less fine resolution can be tolerated. Speeds of this order of magnitude are normally quite fast enough for most assembly tasks. Indeed they represent a substantial improvement over speeds hitherto available in three dimensional imaging devices.

Among the various techniques for obtaining three dimensional data that have been proposed in the past, the use of an active triangulation system employing a beam of radiation, e.g. laser light, that is projected onto an area of the surface to be examined, and a position sensitive detector for measuring deviations in the reflected beam, is the approach that is believed most likely to lead ultimately to achievement of the desirable criteria mentioned above. Systems employing such triangulation have, for example, been described by K. E. Morander in "THE OPTOCATOR. A HIGH PRECISION, NON-CONTACTING SYSTEM FOR DIMENSION AND SURFACE MEASUREMENT AND CONTROL," 5th International Conference on automated inspection and product control, 1980, pp. 393–396; and by T. Kanade and H. Asada in "NON-CONTACT VISUAL THREE-DIMENSIONAL RANGING DEVICES," SPIE Proc. Vol. 283, 1981, pp. 48–53. The principles employed in these systems are explained in more detail below in relation to FIG. 1 of the accompanying drawings.

These systems have certain disadvantages, however, particularly in relation to requiring comparatively bulky apparatus and limiting the size of the field of view that can be obtained. They also exhibit shadow effect problems when used to obtain the profile of objects of certain shapes.

SUMMARY OF THE INVENTION

An objective of the present invention is to provide improvements in respect of these disadvantages. This result is achieved by so synchronising scanning of the projected and detected beams that the detected position in the detector remains unchanged when the beams scans a flat reference surface. The distance of the reference surface from the detector can be set arbitrarily. The detected position changes only when the beam is reflected from a surface point that is either nearer to, or further from, the reference surface.

More specifically, the invention provides for projecting a beam of radiation onto an area of the surface to be examined and detecting a beam reflected from the projected beam by such surface area. The projected and detected beams define a plane which for convenience can be referred to as the "beam plane." This plane intersects the plane of the reference surface (reference plane) along a line that extends in the direction that is considered to be the X direction. So long as the object surface is flat and extends in the X direction, the detected beam strikes the position sensitive detector at the same position regardless of the scanned orientation of the beams, any deviation in such position representing a deviation from the reference plane of the intersection of the beams, i.e. a deviation of the surface area under examination in a direction perpendicular to the reference plane. This latter direction is considered the Z direction and represents the important information about the examined surface that is required to compile the three dimensional data.

An arrangement functioning in this manner has been disclosed in U.S. Pat. No. 4,171,917 issued Oct. 23, 1979 to R. A. Pirlet. Pirlet achieves synchronism of his beams by means of a pair of octagonal mirrors that are caused to rotate in synchronism and, together with other mirrors, to cause the beams to intersect at the surface of the object being examined, which, in his example, is the surface of strip material that is travelling past the device, e.g. a strip or beam coming from a rolling mill or the like. Synchronised rotation of the mirrors in the Pirlet system causes the point of intersection of the beams, i.e. the area of the surface under examination at any given moment, to scan across the strip in a direction perpendicular to the direction of travel of the strip. For example, in Pirlet's FIG. 3a, the intersection point 16 scans in the vertical direction (along the line 3-4 in FIG. 1 or 2) while the strip 1 travels from left to right, direction 5 in FIG. 1, which latter direction is equivalent to the X direction as defined above. Consequently, the Pirlet system is dependent on relative movement of the device and the object under examination in order to achieve scanning of the surface in the second dimension. There is no provision in Pirlet's system, nor would it be practicable for there to be any such provision, having regard to the geometry of his system, for scanning the point 16 from left to right in FIG. 3a, i.e. in the X direction defined by the intersection of the beam plane with the reference plane.

The requirement for relative movement between the workpiece and the surveillance system was presumably no disadvantage in the Pirlet system, since its purpose was to examine moving strip. There are, however, many other application for three dimensional imagining in which either the workpiece is stationary or there is a need to obtain the data much more rapidly (e.g. within a small fraction of a second) than would be possible if the device were required to wait for the movement of the workpiece to provide scanning in the second dimension.

The principal characteristic of the present invention, that overcomes this difficulty and represents an important improvement over the Pirlet system, is that the projected and detected beams are synchronously scanned in a direction lying in the beam plane. As a result, the point of beam intersection is moved in the X direction. This arrangement facilitates simultaneous synchronous scanning in the second dimension, i.e. a direction Y perpendicular to both the X and Z directions, e.g. by means of a simple flat mirror located in the paths of the two beams and rotatable about an axis parallel to the X direction, a possibility that is unavailable to the Pirlet system.

BRIEF DESCRIPTION OF THE DRAWINGS

Embodiments of the invention are illustrated by way of example in the accompanying drawings, in which.

Figure 1:
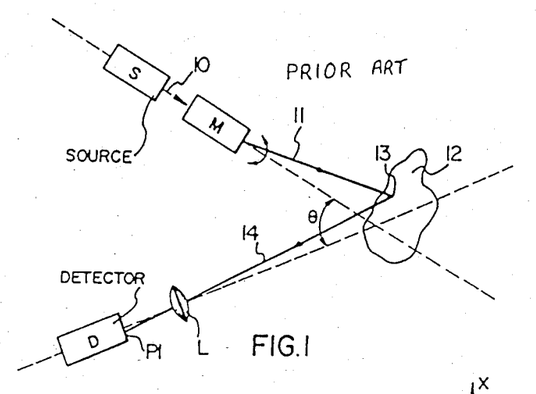
FIG. 1 shows the basic elements of a known triangulation system.

FIG. 1 shows the basic elements of a triangulation system, consisting of a light source S (conveniently, but not necessarily, a laser) supplying a beam 10 to a scanning mechanism M which in turn projects a scanned beam 11 onto an object 12. At a given moment in the scanning process, the beam 11 strikes a point 13 on the object 12. Although this point of impact is thought of as a "point," in fact, due to the diameter of the beam, e.g. about 1 mm, it is more accurately an "area," albeit a comparatively small area. Reflection at the point 13 gives rise to a reflected ("detected") beam 14 that passes through a lens L to be sensed in a position sensitive detector D at point P1. Distance measurement is derived mathematically from the projection direction, i.e. the angular position of the scanning mechanism, and the detection direction as determined by the location of the point P1 on the detector D. A feature of the arrangement shown in FIG. 1 is that the measurement resolution can be increased by increasing the angle $\theta$ between the projection axis and the detection axis, but this can only be done at the expense of the compactness of the instrument and the size of the field of view. Another problem arises in that the shadow effect increases with this angle, since a part of the object "seen" by the projection mechanism may not be seen by the detector. This shadow effect, which can prevent continuous profile recording, becomes more severe as the angle $\theta$ is increased.

The present invention provides a new approach that allows a compact arrangement without compromising the resolution and the field of view, while also enabling the undesirable shadow effects to be kept to a minimum.

Figure 2:
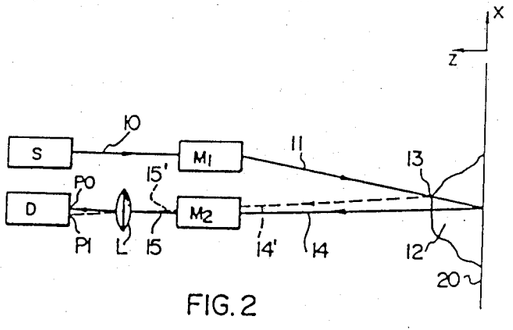
FIG. 2 is a diagram illustrating the manner of operation of the present invention.
Figure 3:
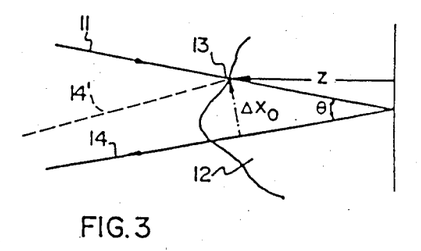
FIG. 3 is a portion of FIG. 2 on an enlarged scale.

As mentioned above, a basic requirement of the present invention is to synchronize the projected and detected beams in such a way that the detected position in the detector remains unchanged as the projected beam scans a flat surface. FIG. 2 shows a flat reference plane 20, scanning of the surface of which will give a zero output, since as the beam 10 is scanned by the first scanning mechanism M1 to generate the beam 11, the reflected beam 14 is simultaneously and synchronously scanned by a second scanning mechanism M2 to generate a detected beam 15 that passes through the lens L to strike the position sensitive detector D at a reference point P0. While this synchronized scanning takes place in the X direction, i.e. in the "beam plane" defined by the beams 11 and 14, the location of the point P0 remains unchanged. When, however, the beam 11 strikes a point 13 of an object 12, the reflected beam 14' becomes the detected beam 15' which strikes the detector D at position P1. This position also remains constant for a given Z deviation from the reference plane 20 throughout the scan in the X direction. These considerations are shown in more detail in FIG. 3 where it will be noted that, provided the angle $\theta$ is small, the detected position shift, i.e. P1−P0, in the detector D is proportional to $\Delta X0$ which is related to Z by the equation $\Delta X0 \simeq Z\theta$. If the value of Z is negative, i.e. to the right of the reference plane 20 as seen in FIGS. 2 and 3, the shift in the detector D will be upward, i.e. on the other side of P0 from P1.

Since this arrangement synchronously scans both the projected and the detected beams, it is possible to maintain a wide field of view, while keeping the resolution along the Z axis independent of the X scan. It is also independent of any scan in the Y direction. Moreover, the resolution of the device along the Z axis can be modified by changing the focal length of the lens L without any reduction in the field of view, in contrast with previous arrangements.

Measurement of the positions of the scanners M1 and M2 provides the X and Y coordinates. For a limited field of view, i.e. up to 5°, no trigonometric computation is required to derive the profile amplitude, i.e. the Z coordinate, since this coordinate can be assumed to be coincident with the beam plane. Hence the three coordinates are readily and easily available. On the other hand, if one accepts a need for computation in the signal processing, i.e. to allow for deviation of the beams from the true Z direction, the device can be designed to cover a very wide field of view, for example up to 90° in each of the X and Y directions.

In addition, a zoom effect can readily be realized by using a zoom lens as the lens L. The depth of the volume sensed is then inversely proportional to the effective focal length of the lens. On the other hand, the same number of positions that the detector can resolve are still available, which means that it is possible to measure small surface details that are not resolved when operating with full depth of view.

Various forms of position sensitive detectors are now commercial available. Both unidimensional (linear) and bidimensional position sensitive detectors are known. One of the advantages of the present arrangement is that it enables a unidimensional detector to be used, while nevertheless obtaining three dimensional information. Since the response time of a unidimensional detector is about two orders of magnitude faster than that of a bidimensional detector, the output rate is consequently enhanced. The type of position sensitive detector chosen for use in the present invention will depend largely on the particular application of the device and on such factors as the resolution and speed of operation required.

Figure 4:
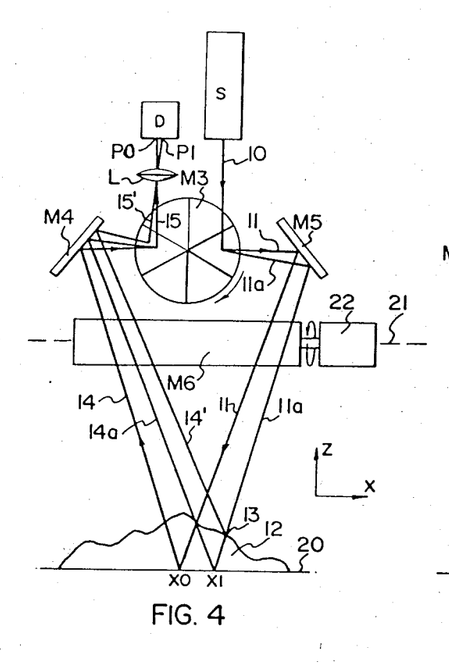
FIG. 4 is a diagrammatic front view of a preferred embodiment of the invention.
Figures 5, 6:
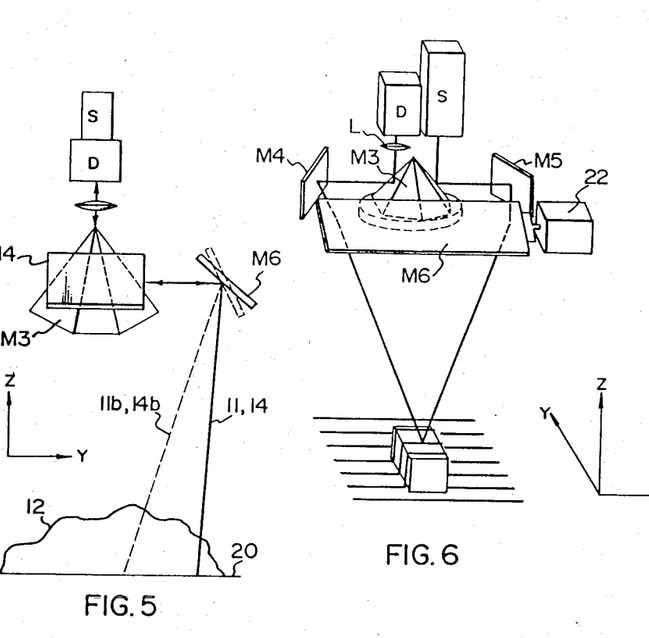
FIG. 5 is a side view of FIG. 4.
FIG. 6 is a perspective view showing the geometry of the arrangement of FIGS. 4 and 5.

FIGS. 4 to 6 show a preferred embodiment of the present invention employing an autosynchronising pyramidal mirror M3 having six facets, a pair of fixed mirrors M4 and M5 and a mirror M6 that can be rotated about an X direction axis 21 by means of a stepping motor 22. The mirrors M4 and M5 are fixed while the device is in operation, although they can be adjusted initially to set the position of the reference plane 20 relative to the device. As seen from FIG. 4, the beam 10 from the source S initially gives rise to a projected beam 11 and hence to detected beams 14 and 15. After a small rotation of the mirror M3, the initial portion 10 of the projected beam will produce a later beam portion 11a. The reference plane 20 has thus been scanned from point X0 to X1. The detected beam portion 14a is reflected by the mirrors M4 and M3 to generate a beam coincident with the previous detected beam 15. Such detected beam 15 is thus still received in the detector D at point P0. On the other hand, a detected beam 14' from the point 13 having a positive Z coordinate relative to the plane 20 becomes the beam 15' which is received at position P1 in the detector D. As seen from FIG. 5, scanning in the Y direction of beam portions 11b and 14b is achieved by stepping of the mirror M6 by the motor 22. In typical operation, the pyramidal mirror M3 will be rotated anywhere from 10 to 300 revolutions per second and the stepping motor 22 will be stepped from about 1500 to 2000 steps per second, with about 1000 steps constituting the full scan in the Y direction.

Hence it will be seen that the portions of the beams 11, 14 etc. that intersect at the plane 20, or at the object point 13, define a "beam plane" that extends in the X direction and generally in the Z direction (subject to some deviation as best shown by the beam portions 11b, 14b). Such beam plane always intersects the reference plane 20 along the X direction.

Figure 7:
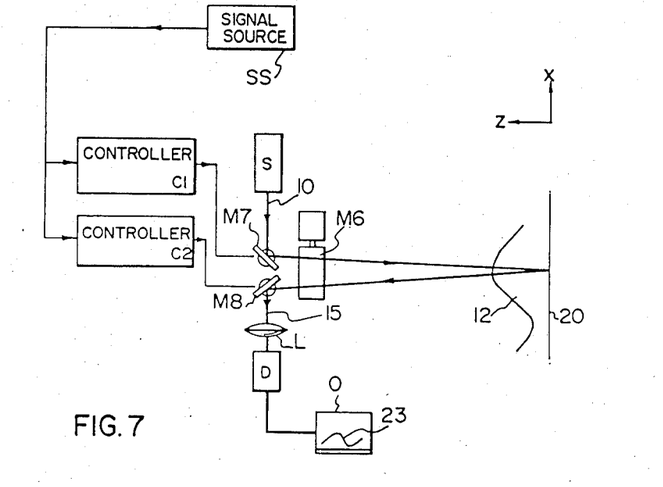
FIGS. 7 and 8 are a plan and a perspective view, respectively, of a second embodiment of the invention.
Figure 8:
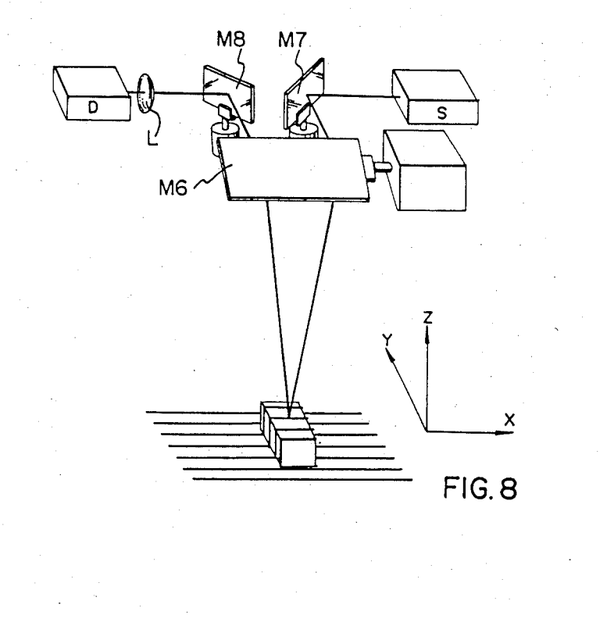

FIGS. 7 and 8 show an alternative embodiment in which the projected and detected beams 10 and 15 are initially reflected by galvonometer driven mirrors M7 and M8, these mirrors being electrically synchronized by controllers C1 and C2 from a ramp signal from a signal source SS. The output signal from the detector D, when seen on an oscilloscope 0, provides a direct profile 23 of Z values proportional to displacement along the X axis, such profile 23 being proportional to the Z value of the object 12. In this embodiment the position of the reference plane 20 can be set electronically by modifying the phase relationship of the two excitation signals passed to the mirrors M7 and M8. As in the previous embodiment, a mirror M6 is used to deflect the intersecting portions of the projected and detected beams perpendicularly to the plane of the initial beams, thus providing a surface profile measurement, namely scanning in the Y direction.

Alternatively, the mirror M6 can be omitted from either of the embodiments of FIGS. 4–6 and 7, 8, if Y scanning can be dispensed with or if one of the other expedients described below is adopted.

Figures 9, 10:
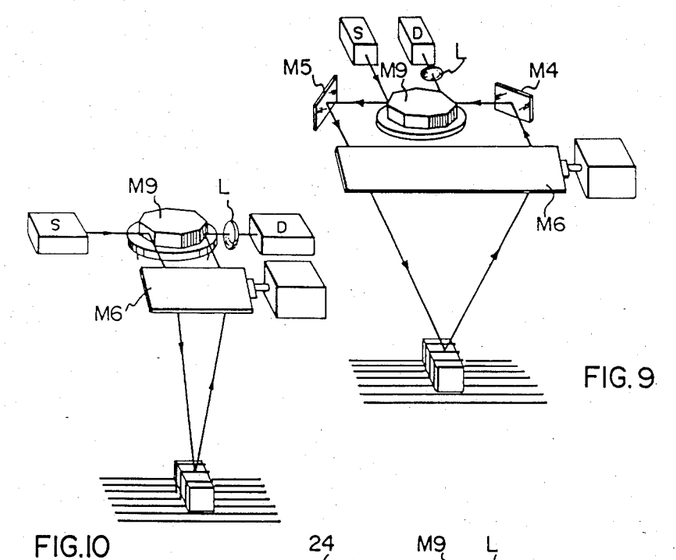
FIG. 9 is a diagrammatic perspective view of another embodiment.
FIG. 10 is a diagrammatic perspective view of another embodiment.

FIG. 9 shows an alternative to the arrangement of FIGS. 4 to 6, in which the pyramidal mirror M3 is replaced by a polygonal mirror M9. Apart from the consequent modification to the locations of the source S and detector D, this arrangement operates in the same way as that of FIGS. 4 to 6.

FIG. 10 shows yet another modification of geometry, again using the mirror M9, but dispensing with the mirrors M4 and M5.

Figure 11:
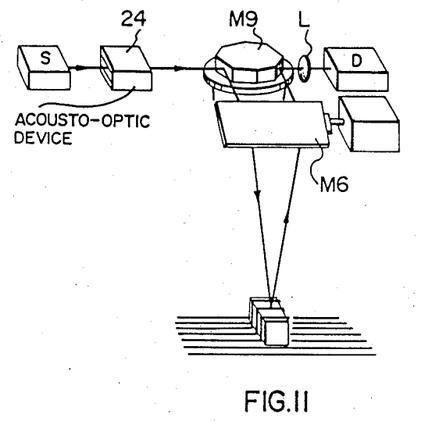
FIG. 11 is a diagrammatic perspective view of another embodiment.

FIG. 11 is the same as FIG. 10, except for the addition between the source S and the mirror M9 of an acousto-optic device 24. This device 24 is used to preprogram the projected beam for a predetermined profile of the object to be scanned. As long as each object scanned has this predetermined profile, the detector output will be zero. The detector thus only observes deviations from the selected profile. This arrangement is particularly well suited to the inspection of a series of articles that are intended to have the same shape. The acousto-optic device 24 can also be used, if desired, to compensate for errors introduced by a large field of view.

Figures 12, 15:
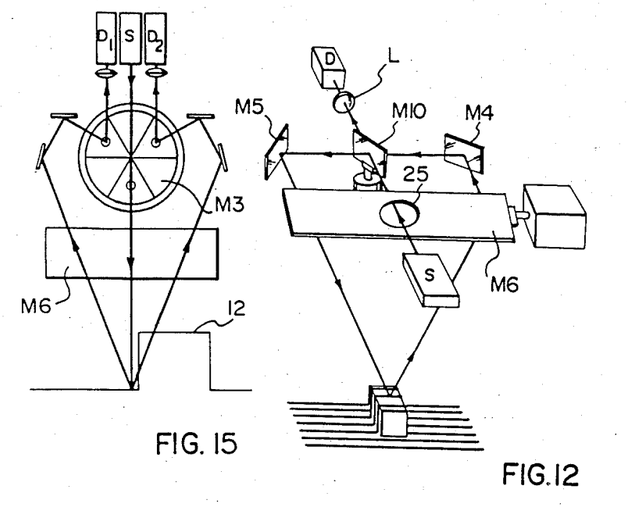
FIG. 12 is a diagrammatic perspective view of another embodiment.
FIG. 15 is a diagrammatic plan view of another embodiment.

FIG. 12 shows yet another geometry employing a galvonometer driven, i.e. ocillating double-sided mirror M10, with the projected beam from the source S passing through a hole 25 in the mirror M6.

Figure 13:
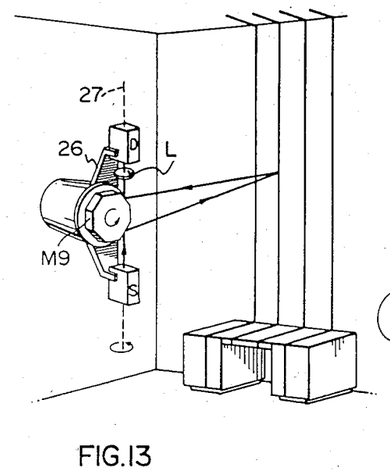
FIG. 13 is a diagrammatic perspective view of another embodiment.
Figure 14:
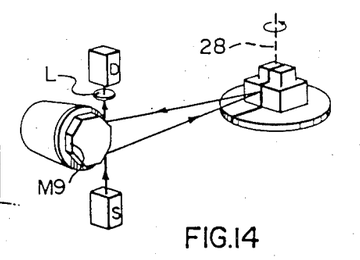
FIG. 14 is a diagrammatic perspective view of another embodiment.

In the embodiment of FIG. 13, the geometry of FIG. 10 is modified to dispense with the mirror M6 and to support the source S and detector D on a common mount 26 with the motor driven mirror M9. This arrangement is especially applicable to the sweeping out of the contours of a surrounding space, such as a room, the scanning in the Y direction being achieved by rotation of the entire device about the axis 27. As an alternative, as shown in FIG. 14, this scanning can be achieved by rotating the object about an axis 28.

FIG. 15 shows the use of a pair of detectors D1 and D2 each of which could operate basically in accordance with any one of the foregoing embodiments, although they have here been illustrated specifically in relation to use with the rotated pyramidal mirror M3, suitable associated fixed mirrors and the mirror M6. This arrangement minimizes the shadow effect problem. The object 12 is shown obscuring the beam received by the detector D2, this shortcoming being overcome by the beam received by the detector D1. One or other of the detectors, or both, will receive a beam in more situations than when using a single detector.

Although any light source can be used, a laser beam as many advantages. It can be comparatively cheaply generated and renders the device compact for a brightness that is orders of magnitude higher than that of a source of non-coherent light. A large depth of field can be obtained and an interferometric filter can be used to improve the signal to noise ratio, whereas a device using non-coherent light must be operated in a darkened environment. Both diode and helium-neon lasers can be used. One of the advantages of a diode laser is that its infrared emission tends to match well the peak sensitivity of silicon detectors which are commonly used in the position sensitive detector. Another advantage of the use of a laser source is that its intensity can readily be electrically controlled, opening up the possibility of servo loop control of the laser output intensity.

The form of radiation used is not limited to coherent or non-coherent light, but can include any form of radiation capable of being effectively collimated and deflected by available devices as well as being reflected by the object under examination. Such radiation can include that in the ultraviolet and X-ray spectra and in the infrared and microwave frequencies. It is also possible to use high frequency sound radiation, provided an appropriate position sensor and collimated beam are available.

In addition, instead of using mirrors to deflect the beams, the invention includes the use for this purpose of any scanning mechanism including acousto optic devices. Such devices are known and examples are described in the 1981 edition of The Optical Industry and Systems Purchasing Directory, pages E-161 to E-164.

I claim:

1. In a method of determining the profile of a surface relative to a reference plane, comprising projecting a beam of radiation to strike an area of the surface and detecting a beam reflected by such surface area, portions of the projected and detected beams that intersect at said area defining a beam plane that intersects the reference plane along a direction X; the improvement comprising synchronously scanning said beam portions in the beam plane to move in the direction X the surface area at which said beam portions intersect, whereby each detected position of the detected beam in the direction X represents a deviation of a respective said area from the reference plane in a direction Z perpendicular to the reference plane.

2. The method of claim 1, including further synchronously scanning said projected and detected beam portions relative to the reference plane in a direction Y perpendicular to both the directions X and Z.

3. The method of claim 2, wherein said radiation is coherent light.

4. An imaging device for determining the profile of a surface relative to a reference plane, comprising (a) a source of radiation mounted for projecting a beam onto an area of the surface,
(b) a position sensitive detector mounted for detecting a beam reflected by such surface area,
(c) portions of the projected and detected beams defining a beam plane that intersects the reference plane along a direction X, and
(d) primary means for synchronously scanning said beam portions in said beam plane to move the surface area at which said beam portions intersect in the direction X, whereby respective positions in said detector in the direction X at which the detected beam is received represent deviations of respective said areas from the reference plane in a direction Z perpendicular to said reference plane.

5. The device of claim 4 including
(e) further means for synchronously scanning said portions of the projected and detected beams relative to the reference plane in a direction Y perpendicular to both said directions X and Z.

6. The device of claim 4, wherein said radiation is of a type capable of being deflected by a mirror and said primary scanning means comprises a pair of mirror surfaces located for simultaneously deflecting respective said beams, and means for rotating said mirror surfaces in synchronism.

7. The device of claim 5, wherein said mirror surfaces are facets of a multifaceted mirror mounted for rotation about an axis extending in the direction Z.

8. The device of claim 5, wherein said further scanning means comprises a further mirror and means for mounting said further mirror for rotation relative to the reference plane about an axis extending in the direction X.

9. The device of claim 7, wherein said further scanning means comprises a further mirror and means for mounting said further mirror for rotation relative to the reference plane about an axis extending in the direction X.

10. The device of claim 5, wherein said further scanning means comprises means for rotating the primary scanning means relative to the reference plane about an axis extending in the direction X.

11. The device of claim 7, wherein said further scanning means comprises means for rotating the primary scanning means relative to the reference plane about an axis extending in the direction X.

12. The device of claim 5, wherein said further scanning means comprises means for rotating said surface relative to the reference plane about an axis extending in the direction X.

13. The device of claim 7, wherein said further scanning means comprises means for rotating said surface relative to the reference plane about an axis extending in the direction X.

14. The imaging device of claim 4, including additional means for deflecting the projected beam to correspond to a predetermined profile whereby the received position of the detected beam in the detector is unchanged when said surface exhibits such predetermined profile.

15. The imaging device of claim 4, including additional means for deflecting the projected beam in accordance with a predetermined program whereby the received position of the detected beam in the detector is compensated for distortion due to a wide field of view of at least one of the primary and further scanning means.

16. The imaging device of claim 4, including a second position sensitive detector mounted for detecting a second beam reflected from the projected beam by each surface area, the second detected beam being located on the opposite side of the protected beam from the first detected beam, said primary and further scanning means acting on the second detected beam in the same manner as on the first detected beam.

17. An imaging device for determining the profile of a surface in a direction Z relative to a reference plane, comprising
   (a) a laser for projecting a beam substantially in the direction Z,
   (b) a position sensitive detector mounted for receiving a detected beam extending substantially in the direction Z,
   (c) a pyramidal mirror rotatably mounted about an axis extending substantially in the direction Z and having facets in the paths of said beams for deflecting said paths substantially into a direction X perpendicular to the direction Z,
   (d) flat mirrors located in the paths of the deflected beams for further deflecting said paths substantially into a direction Y perpendicular to both the directions X and Z,
   (e) a further flat mirror located in the paths of the beams deflected substantially into the direction Y for still further deflecting said paths substantially into the direction Z for intersection at an area of the said surface at which the detected beam is reflected from the projected beam, such still further deflected portions of the beams defining a beam plane intersecting the reference plane along the direction X,
   (f) means for rotating said pyramidal mirror for synchronously scanning said beams and hence scanning said intersection in the direction X whereby respective positions in the detector in the direction X at which the detected beam is received represent deviations of respective said areas from the reference plane in the direction Z, and
   (g) means for rotating said further mirror about an axis extending in the direction X whereby to scan synchronously said still further deflected portions of the beams and hence said intersection in the direction Y.

18. An imaging device for determining the profile of a surface in a direction Z relative to a reference plane, comprising
   (a) a laser for projecting a beam substantially in a direction X perpendicular to the direction Z,
   (b) a position sensitive detector mounted for receiving a detected beam extending substantially in the direction X,
   (c) a plurality of flat mirror surfaces each rotatably mounted about an axis extending in the direction Z and respectively located in the paths of said beams for deflecting said paths substantially into a direction Y perpendicular to both the directions X and Z,
   (d) a further flat mirror located in the paths of the beams deflected substantially into the direction Y for further deflecting said paths substantially into the direction Z for intersection at an area of said surface at which the detected beam is reflected from the projected beam, such further deflected portions of the beams defining a beam plane intersecting the reference plane along the direction X,
   (e) means for synchronously rotating said mirror surfaces for synchronously scanning said beams and hence scanning said intersection in the direction X, whereby respective positions in the detector in the direction X at which the detected beam is received represent deviations of respective said areas from the reference plane in the direction Z, and means for rotating said further mirror about an axis extending in the direction X whereby to scan synchronously said further deflected portions of the beams and hence said intersection in the direction Y.

19. The device of claim 4, wherein said radiation is of a type capable of being deflected by a mirror and said primary scanning means comprises a thin, flat member having mirror surfaces on opposite major faces thereof respectively located for simultaneously deflecting respective said beams, and means for oscillating said member.

20. The device of claim 19, including further means for synchronously scanning said portions of the projected and detected beams relative to the reference plane in a direction Y perpendicular to both said directions X and Z.

21. An imaging device for determining the profile of a surface in a direction Z relative to a reference plane, comprising
   (a) a thin, flat member having mirror surfaces on opposite major faces thereof,
   (b) means for projecting a laser beam at one of said mirror surfaces,
   (c) a position sensitive detector mounted for receiving a detected beam from the other of said mirror surfaces,
   (d) further mirror means located in the paths of beams deflected by said mirror surfaces for further deflecting said paths substantially into the direction Z for intersection at an area of the said surface at which the detected beam is reflected from the projected beam, portions of such further deflected beam paths defining a beam plane intersecting the reference plane along a direction X perpendicular to the direction Z, and
   (e) means for oscillating said member and hence scanning said intersection in the direction X whereby respective positions in the detector in the direction X at which the detected beam is received represent deviations of respective said areas from the reference plane in the direction Z.

22. A device according to claim 21, wherein said further mirror means include means for synchronously scanning said portions of the beam paths relative to the reference plane in a direction Y perpendicular to both said directions X and Z.

* * * * *